United States Patent [19]
Takasaki

[11] 4,290,522
[45] Sep. 22, 1981

[54] SPECTACLE HOLDER

[76] Inventor: Takao Takasaki, No. 4920-2, Oaza Hirano, Nichinan-shi, Miyazaki-ken, Japan

[21] Appl. No.: 77,261

[22] Filed: Sep. 20, 1979

[30] Foreign Application Priority Data

Sep. 20, 1978 [JP] Japan ............................ 53-129899[U]

[51] Int. Cl.³ ............................................. A45C 11/04
[52] U.S. Cl. ........................................ 206/5; 206/233; 206/38; 24/3 C; 224/312
[58] Field of Search .................. 206/5 R, 38, 37, 233; 24/3 C, 3 G; 224/352

[56] References Cited

U.S. PATENT DOCUMENTS

| | | | |
|---|---|---|---|
| 814,950 | 3/1906 | Evans | 229/1.5 R |
| 1,740,134 | 12/1929 | Winston | 206/5 R |
| 2,277,371 | 3/1942 | Simpson | 206/5 R |
| 2,499,332 | 2/1950 | Schiff | 206/5 R |
| 2,541,962 | 2/1951 | Healey | 206/5 R |
| 3,466,774 | 9/1969 | Borresen | 206/38 |
| 3,921,797 | 11/1975 | Platt | 206/5 R |
| 3,994,391 | 11/1976 | Holland | 206/5 R |

Primary Examiner—William T. Dixson, Jr.
Attorney, Agent, or Firm—Lane, Aitken, Kice & Kananen

[57] ABSTRACT

A spectacle holder having a cover sheet consisting of a main section and a flap section which are foldable toward each other to hold the spectacle glasses, the flap section having notches in the opposite end portions thereof to receive base end portions of the bows of the frame. The holder is detachably attachable to a belt or a wall surface.

4 Claims, 7 Drawing Figures

SPECTACLE HOLDER

BACKGROUND OF THE INVENTION

This invention relates to a spectacle holder.

The existing spectacle holders or cases are in most cases designed to receive the whole structure of spectacles in folded state. The conventional spectacle cases are generally bulky and inconvenient to carry in pockets, and the bows are apt to be deformed when forcibly confined in the narrow spaces of the cases. Therefore, most people do not carry spectacles in such cases and they usually put naked spectacles in the breast pockets or just leave them in handy places when not necessary. Under such circumstances, the spectacles often get lost due to the forgetfulness on the part of the user and the glasses are easily broken when dropped or covered with dust when left naked. Moreover, it is often the case that they do not carry with them a cleaning cloth and have nothing to wipe with when a necessity for cleaning the glasses arises.

SUMMARY OF THE INVENTION

The present invention contemplates to provide a wieldy spectacle holder which, in contrast to the conventional spectacle cases, covers only the glasses of the spectacles and which is less bulky and convenient to carry without deformations of the bows.

The spectacle holder according to the present invention employs a generally rectangular, flexible cover sheet with a main section and a flap section which are foldable toward each other to embracingly hold the glasses of the spectacles, the flap section being provided with notches in the opposite end portions thereof to receive base end portions of bows of the spectacle frame which are to be folded thereon. In spite of its extremely simple construction, the holder of the invention can hold the spectacles securely therein, the notches in the flap section preventing the spectacles from slipping out of the holder.

The bows which are folded on the outer side of the flap section may sometimes be unintentionally unfolded. In order to prevent spontaneous unfolding of the bows, the flap section of the cover sheet is externally provided with a short strap which holds the bows in the folded state.

In an outdoor activity like fishing or while carrying out a work in a factory or driving a car, it is often desired to keep the spectacles in a more handy place than a pocket. According to another feature of the spectacle holder of the invention, the main section of the cover sheet is provided with means for detachably attaching the holder to a belt or to a wall surface or the like.

For putting the spectacles into or out of the holder, the flap section or lid need not be opened 180° and suffices to be opened 90° at maximum. It is preferred that the opening angle of the flap be limited to a suitable extent especially in a case where the holder is handled with one hand, in order to facilitate the manipulation and at the same time to prevent the spectacles from dropping easily by a wide opening.

Still another feature of the spectacle holder of the present invention resides in that the cover is provided between the main body and the flap with means for retaining the flap in a half-open position.

DESCRIPTION OF PREFERRED EMBODIMENTS

Figure 1:
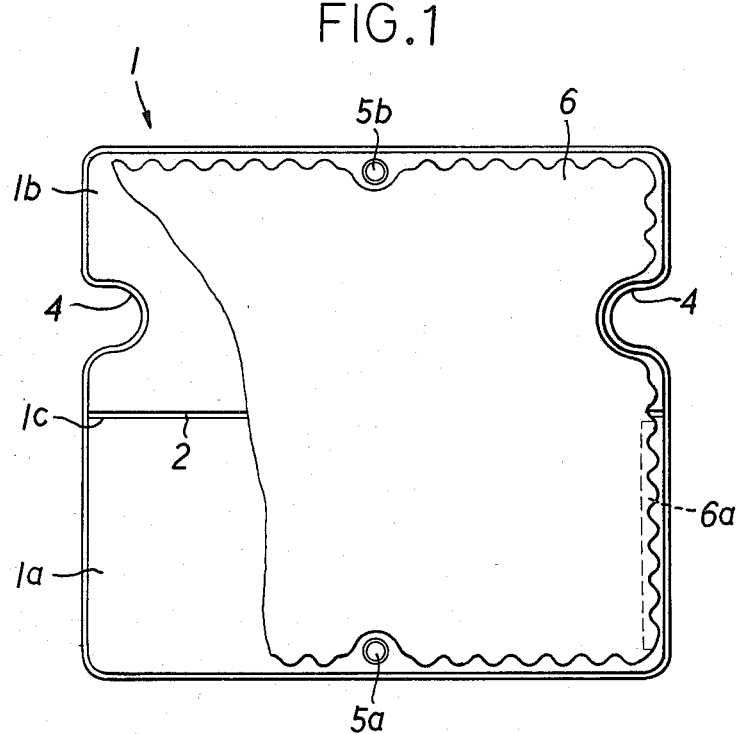
FIG. 1 is a partly cutaway front view of a spectacle holder embodying the present invention, showing the holder in a flat full-open position.
Figure 2:
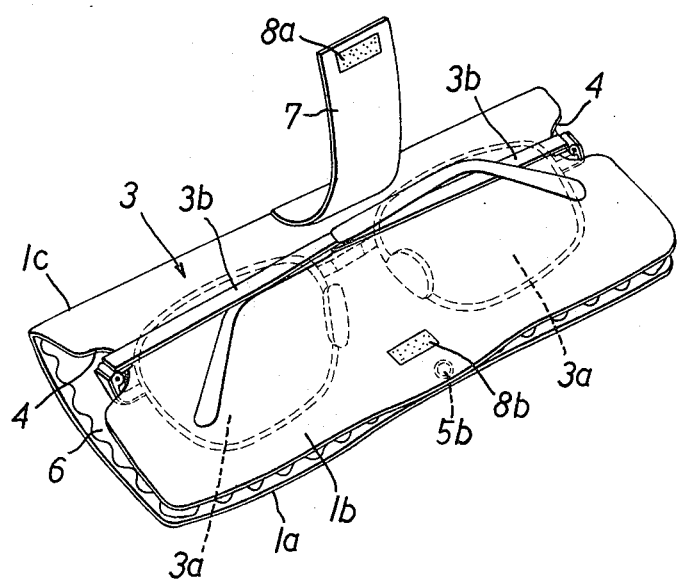
FIG. 2 is a perspective view of the spectacle holder which is closed to hold a pair of spectacles therein.

Referring to the accompanying drawings and first to FIGS. 1 and 2, the spectacle holder according to the present invention is a generally rectangular cover sheet 1 which consists of a main section 1a and a flap section or lid 1b for embracingly holding the spectacle glasses 3a. The main section 1a and the flap lid 1b are foldably connected to each other through a folding portion 1c with a fold line 2. The cover sheet 1 defines longitudinal edges parallel to and distal to the fold line 2.

The cover sheet 1 may be formed from a flexible sheet material, e.g. a sheet of synthetic resin such as polyvinyl chloride, leather or synthetic leather. Alternatively, the main body 1a and the flap lid 1b may be formed separately and foldably connected with each other by a folding portion which is constituted by a thread, filament, cord, tape, welding or the like.

The flap lid 1b is provided with notches 4 in the opposite end portions to receive the base end portions of bows 3b of the frame. The main body 1a and the flap lid 1b are provided with closure or fastening elements 5a and 5b at the center of the respective meeting free ends, for example, elements of a magnet or hook fastener.

A strip of cleaning cloth 6 is spread over the inner side of the cover sheet 1 to cover substantially the entire inner surfaces of the main section 1a and the flap section 1b. The cleaning cloth 6 is attached to the cover sheet 1 at its one marginal edge as indicated at 6a. Though not essential, the cleaning cloth 6 is provided with notches similar to the notches 4 of the flap section 1b.

In order to put the spectacles 3 in the cover 1, the spectacle glasses 3a are inserted between the main section 1a and the flap section 1b and the bows 3b which are led out through the notches 4 of the flap section 1b are folded onto the outer surface thereof, then closing the flap 1b onto the main section 1a by engaging the fastening elements 5a and 5b.

The cover 1 sheathes the spectacle 3 with a reduced bulk as compared with the conventional cases which encase the whole structure of the spectacles, precluding the possibility of deformation of the bows 3b which would be caused by forcing them into a confined space. Therefore, it becomes easier to carry the encased spectacles in a pocket of garments. In addition, the spectacle sheathed in the cover 1 has its bows 3b fitted in the notches 4 of the flap section 1b so that they would not come off even when the cover were opened by accidental disengagement of the fastening elements 5a and 5b.

Spontaneous unfolding of the bows 3b can be prevented by providing a strap 7 which holds the bows 3b in the folded position. More particularly, as shown in FIG. 2, a bow holding strap 7 is provided centrally across the flap section 1b, the strap 7 having one end thereof fixed to the flap section 1b at a position close to the folding portion 1c and having at the other end a fastening element 8a which is engageable with a fastening element 8b on the part of the flap section 1b.

Figure 3:
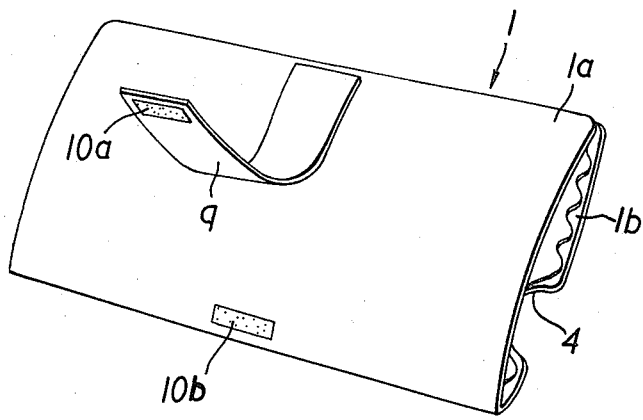
FIGS. 3 and 4 are a perspective view and a sectional view showing another embodiment of the present invention.
Figure 4:
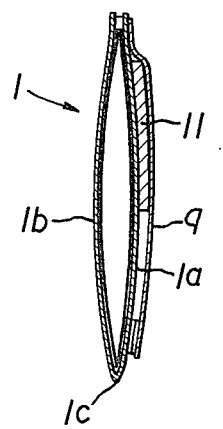

Referring to FIGS. 3 and 4, there is shown another embodiment of the present invention which, if desired, can be attached to a waist belt or band of trousers or the like, for example, during fishing or when performing a job in a factory. In this embodiment, a carrying strap 9 is provided crosswise on the outer surface of the main section 1a of the cover sheet 1. The carrying strap 9 has at its free end a fastening element 10a which is engageable with a fastening element 10b which is provided on the main section 1a.

In order to attach the spectacle holder 1, for example, to a belt 11 of trousers, the carrying strap 9 is passed around the belt, preferably in such a manner that the holder 1 has its opening on the upper side and the folding portion 1c on the lower side as shown particularly in FIG. 4 in order to ensure easier and safer handling of the spectacles. It is also preferred to pass the carrying strap 9 around the trouser belt 11 from above so that the releasable end of the strap 9 comes beneath the belt 11. By so doing, the spectacle holder 1 is prevented from immediately coming off the belt 11 when the fastening elements 10a and 10b are accidentally disengaged.

Figure 5:
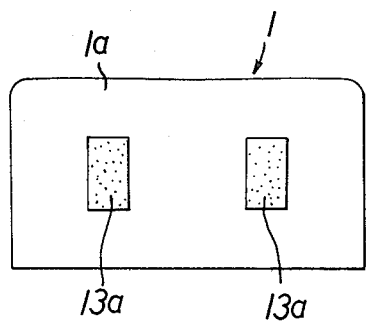
FIG. 5 is a back view of still another embodiment of the present invention.
Figure 6:
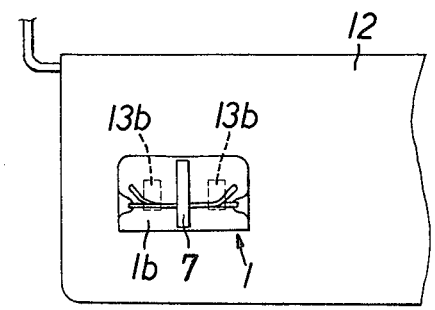
FIG. 6 is a front view of the spectacle holder of FIG. 5, showing the holder as attached to a sun shield of a motor vehicle.

FIGS. 5 and 6 illustrate a spectacle holder which can be detachably mounted on a panel or wall surface, for instance, on a sun shield in a driver's cabin of a motor vehicle as shown in FIG. 6. The spectacle holder is provided on the outer side of the main section 1a with fastening elements 13a such as magnets, hooks, adhesive and the like which are engageable with the elements 13b which are provided on the sun shield 12.

With the spectacle holder mounted on the sun shield 12, the driver can easily put the spectacles into and out of the holder with one hand during driving. Needless to say, the spectacle holder can be mounted on any arbitrary wall surface other than the sun shield 12.

Figure 7:
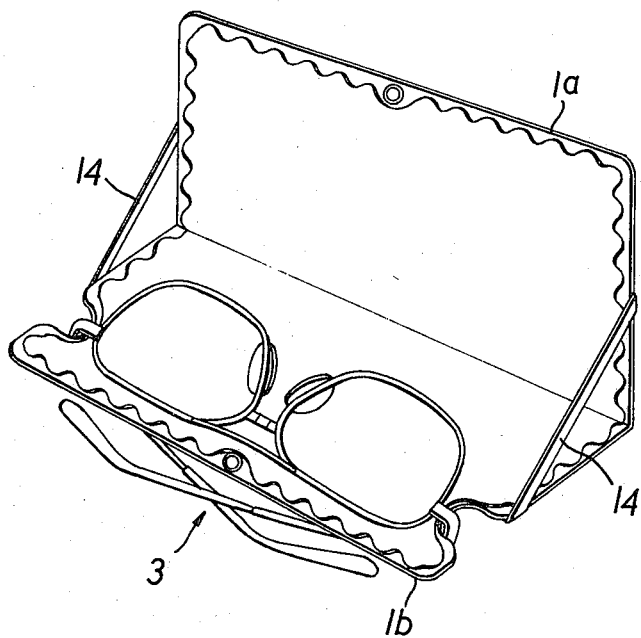
FIG. 7 is a perspective view of still another embodiment of the present invention, showing the holder in a half-open position.

Referring now to FIG. 7, there is shown a spectacle holder having limiting strips 14 foldably between the main section 1a and the flap section 1b to limit the maximum angle of opening of the holder formed by the main and flap sections. It is preferred to limit the maximum angle to a value slightly smaller than 90° not to let the spectacles fall off easily when handled inadvertently. This arrangement is desirable particularly where the spectacles are handled with one hand to put them into or out of a holder which is mounted on a wall or sun shield as in the preceding embodiment.

It will be appreciated from the foregoing description that the spectacle holder of the present invention can hold spectacles in a safe and secure manner, and is simple in construction, less bulky and easy to carry.

What is claimed is:

1. A spectacle holder comprising:
   a generally rectangular flexible holder sheet having a width longer than that of a spectacle frame and consisting of a main section and a flap section interconnected by a folding line to be foldable toward each other and holding between said main and flap sections spectacle glasses with the top portion of the spectacle frame facing toward the folding line, said main and flap sections defining longitudinal edges distal to the folding line;
   notches formed in the opposite end portions of said flap section adjacent to the folding line to receive base end portions of bows of said spectacle frame, said opposite end portions of said flap section extending beyond said base end portions between the notches and the longitudinal edge of the flap section so that the spectacle frame is embracingly held on said flap section between the opposite notches when said bows are folded along the outer periphery of said flap section, thereby preventing the spectacles from slipping off of the holder sheet; and
   a cleaning cloth attached to the inner side of said holder sheet.

2. A spectacle holder as set forth in claim 1, further comprising a bow holding strap having one end thereof fixed to said flap section to extend centrally across the outer surface thereof to hold said bows in folded state, and said bow holding strap having the other end releasably fixed to said flap section.

3. A spectacle holder as set forth in claim 1, wherein said holder sheet is provided with fastening elements for detachably attaching said holder to a belt or a wall surface.

4. A spectacle holder as set forth in claim 3, further comprising means for limiting the maximum angle of opening formed by said main section and said flap section.

* * * * *